(12) United States Patent
Miyahara

(10) Patent No.: US 6,606,052 B1
(45) Date of Patent: Aug. 12, 2003

(54) METHOD AND APPARATUS FOR DETECTING MULTIPLE OBJECTS WITH FREQUENCY MODULATED CONTINUOUS WAVE RADAR

(75) Inventor: Shunji Miyahara, Yokohama (JP)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/093,254

(22) Filed: Mar. 7, 2002

(51) Int. Cl.[7] .............................................. G01S 13/93
(52) U.S. Cl. ...................... 342/70; 342/107; 342/112; 342/118; 342/128; 342/129; 342/130
(58) Field of Search ............................. 342/70–72, 107, 342/112, 128–130, 118

(56) References Cited

U.S. PATENT DOCUMENTS

| | | | |
|---|---|---|---|
| 4,003,049 A | 1/1977 | Sterzer et al. ................. 343/6 |
| 4,960,329 A | 10/1990 | Schofield ........................ 356/5 |
| 5,270,720 A | 12/1993 | Stove ........................... 342/174 |
| 5,381,153 A | 1/1995 | Saito et al. .................... 342/70 |
| 5,483,242 A | 1/1996 | Grein et al. ................. 342/111 |
| 5,530,448 A | 6/1996 | Lewis ........................... 342/132 |
| 5,563,602 A | 10/1996 | Stove ............................. 342/70 |
| 5,657,022 A | 8/1997 | Van Etten et al. ........... 342/104 |
| 5,920,280 A * | 7/1999 | Okada et al. ................ 342/109 |
| 5,940,024 A | 8/1999 | Takagi et al. ................. 342/70 |
| 5,963,163 A | 10/1999 | Kemkemian et al. ........ 342/109 |
| 6,072,422 A | 6/2000 | Yamada ......................... 342/70 |
| 6,097,331 A | 8/2000 | Matsugatani et al. ......... 342/70 |
| 6,121,915 A | 9/2000 | Cooper et al. ................. 342/70 |
| 6,137,435 A | 10/2000 | Kai ................................ 342/70 |
| 6,384,769 B1 * | 5/2002 | Mitsumoto et al. ......... 342/109 |
| 6,396,436 B1 * | 5/2002 | Lissel et al. ................... 342/70 |

* cited by examiner

Primary Examiner—Thomas H. Tarcza
Assistant Examiner—Isam Alsomiri
(74) Attorney, Agent, or Firm—MacMillan, Sobanski & Todd, LLC

(57) ABSTRACT

A method and an apparatus for multiple object detection by automotive FMCW radars provides distance and relative velocity information. A two chirp frequency sweep with small slope difference is utilized and, since the difference is small, the distance information can be obtained by automatically eliminating the Doppler frequency. Therefore, the distance and the relative velocity information for each of multiple objects can be calculated without ambiguity.

20 Claims, 5 Drawing Sheets

METHOD AND APPARATUS FOR DETECTING MULTIPLE OBJECTS WITH FREQUENCY MODULATED CONTINUOUS WAVE RADAR

FIELD OF THE INVENTION

The present invention relates to a method and an apparatus for obtaining distance and velocity information from multiple objects using frequency modulated, continuous wave (FMCW) radar, especially for use in automotive adaptive cruise controls (ACC).

BACKGROUND OF THE INVENTION

The FMCW radar is suitable for the distance measurement of plural objects with small relative velocities. However, in an application like automotive ACC, there are plural objects and the relative velocity changes widely, e.g. from −200 km/h to +200 km/h. The plural objects and the wide velocity range make it difficult to determine the exact pairing of the beat frequencies in each ramp, corresponding to a certain object. And after a pair is correctly selected, the wide velocity range results in an ambiguity between the distance and relative velocities of the objects. Several methods to overcome this problem have been proposed, but such methods are complicated and not practical.

For example, if only one target can be illuminated at a time, alternating frequency modulation ramps with opposite slopes can be used. In certain multiple target situations, a third frequency ramp is used, generally with zero slope and then finally a fourth sequence may be necessary to remove the doubt. Also, the distance and relative velocity of objects can be determined by using a complex look-up table, which has the information on the beat frequencies in each ramp.

SUMMARY OF THE INVENTION

The present invention concerns an apparatus and method utilizing an algorithm based upon a two chirp frequency sweep with small slope-difference. Since the difference is small, the correct pairing of the beat signals in each ramp is uniquely determined. The distance information can be obtained by automatically eliminating the Doppler frequency. Therefore, the distance and velocity information for multiple objects can be calculated without ambiguity.

The method according to the present invention comprises the steps of: a. generating a continuous wave radar signal; b. modulating the continuous wave radar signal with a pair of chirp frequency sweeps having slightly different slopes to generate a frequency modulated continuous wave (FMCW) radar signal; c. transmitting the FMCW radar signal toward a pair of objects; d. receiving a reflected radar signal from each of the objects; e. obtaining the beat signals by mixing the transmitted and reflected radar signals; f. applying the Fourier Transform to the beat signals and determining the correct pair of the peak frequency of the beat signals in each ramp, corresponding to a certain object; g. calculating the distance from the pair by eliminating the velocity; h. calculating the velocity by using the distance information; and i. indicating a distance and/or relative velocity to each of the objects.

The apparatus, according to the present invention, for detecting multiple objects using frequency modulated continuous wave radar includes: a modulator for generating two chirp signals, the two sweeps having slightly different slopes; a RF oscillator for generating a continuous wave radar signal frequency-modulated by the modulator; a directional coupler dividing the radar signal; a transmitting antenna connected to the coupler for transmitting the divided frequency modulated continuous wave radar signal; a receiving antenna for receiving a reflected radar signal representing a portion of the transmitted radar signal reflected from each of plural objects; a mixer and a low/band pass filter connected to the coupler and to the receiving antenna and responsive to the transmitted radar signal and the reflected radar signal for generating a beat signal including the information of all the objects for each of the two sweeps; and a Low/band pass filter for filtering the beat signal and a signal processor connected to the filter and responsive to the beat signals for applying the Fourier Transform, usually FFT (Fast Fourier Transform), calculating the distance and velocity for each object, and indicating a distance to each of the objects.

The present invention is proposed for multiple object detection in automotive FMCW radars. Such radars include ACC (adaptive cruise control) radar, Stop & Go, collision avoidance radar, side-object detection radar, etc. The algorithm according to the present invention can provide the distance and relative velocity for multiple objects. This algorithm is simple and fast, and suitable for automotive application, in which the update time is less than 100 msec.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIGS. 5a and 5b are a comparison of the prior art radar signal shown in FIG. 2a with the dual chirp radar signal shown in FIG. 4a;

DESCRIPTION OF THE PREFERRED EMBODIMENT

The method and apparatus according to the present invention utilize an algorithm for the detection of multiple objects by automotive FMCW radars such as ACC (adaptive cruise control) radar, Stop & Go, collision avoidance radar, side-object detection radar, etc. This algorithm can provide the distance and relative velocity for multiple objects in a simple and fast manner suitable for automotive applications in which the update time typically is less than 100 msec. The algorithm is based on a two chirp frequency sweep with small slope-difference. Since the difference is small, it is not difficult to determine the exact pairing of the peak frequency of the beat signal in each ramp, corresponding to a certain object. Then through the simple calculation, the distance information can be obtained by eliminating the Doppler frequency. Therefore the distance and velocity information for multiple objects can be calculated without ambiguity.

Figure 1:
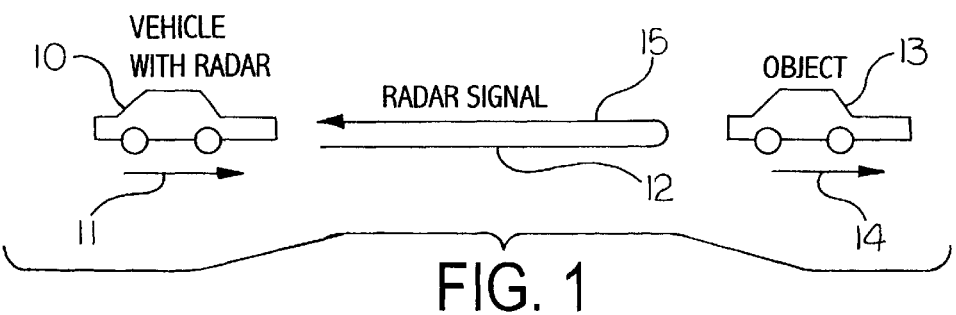
FIG. 1 is a schematic representation of the use of FMCW radar for an automobile adaptive cruise control.

FIG. 1 is a schematic representation of a FMCW radar application in an automobile. A first vehicle 10 having FMCW radar (not shown) is travelling in a direction represented by an arrow 11. The FMCW radar in the first vehicle 10 transmits a radar signal 12 in a forward direction. A second vehicle 13 is ahead of the first vehicle 10 and is travelling in the same direction as represented by an arrow 14. If the second vehicle 13 is within range of the FMCW radar, the transmitted radar signal 12 strikes the second vehicle and generates a reflected radar signal 15. The reflected radar signal 15 is received by the FMCW radar and is processed to obtain the distance and relative velocity between the vehicles 10 and 13. The distance information and the relative velocity information are used for vehicle control and safety warning purposes.

Figure 2:
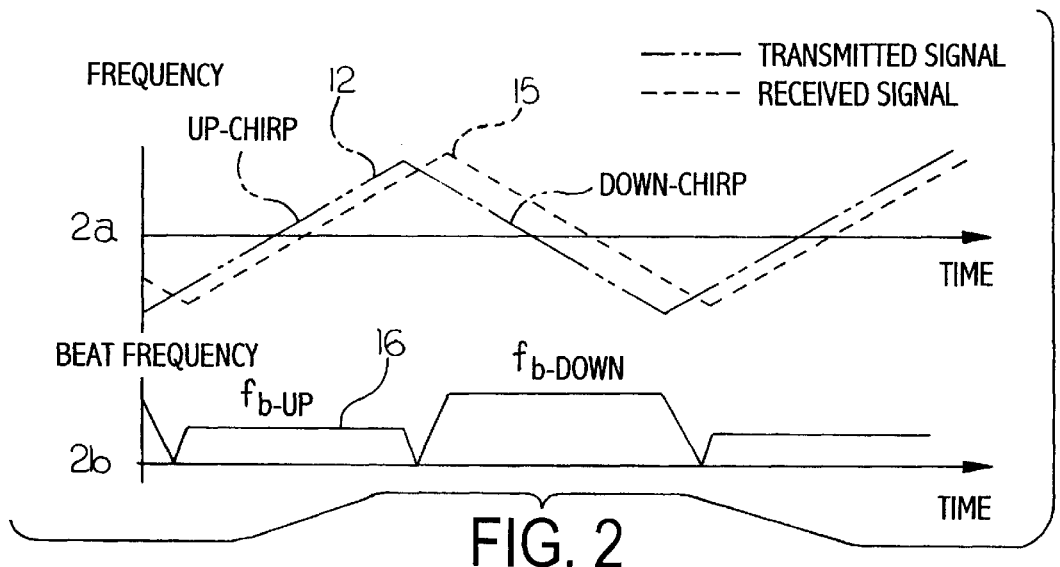
FIGS. 2a and 2B are plots of frequency versus time for the signals generated by one type of prior art FMCW radar.

If the first vehicle 10 is equipped with a conventional technology FMCW radar, the transmitted 12 and received 15 radar waves can be expressed as frequency versus time plots as shown in FIG. 2a. The transmitted signal 12 is a linearly frequency modulated RF signal alternately ramped up (up-chirp) and ramped down (down-chirp). The received signal 15, as reflected from objects, is time displaced from the transmitted signal 12. The two signal are mixed and a beat signal 16 is obtained as shown in FIG. 2b. The beat frequencies are given by the equations:

$f_{b\text{-}up}=|f_r-f_d|$ for up-chirp $f_{b\text{-}down}=|f_r+f_d|$ for up-chirp The range frequency $f_r$ and the Doppler frequency $f_d$ are defined by the following equations:

$f_r=(2R/c)(df/dt)$ $f_d=2V/\lambda$ where R, c, df/dt, V and λ are the distance between the object 13 and vehicle 10 with radar, the velocity of the RF wave, the rate of change of the carrier frequency, the relative velocity (approaching is assumed positive) and the wavelength, respectively.

The conventional FWCW radar signals shown in FIG. 2a typically can be generated with a 77.0 GHz carrier frequency modulated with a 250 Hz chirp cycle at a frequency modulation of 150 MHz. Thus, the up-chirp is a positive 150 MHz change in approximately two milliseconds and the down-chirp is a negative 150 MHz change in approximately two milliseconds. This waveform results in Doppler frequencies of approximately 3.6, 7.1, 14.3 and 21.4 kHz for relative velocities of 25, 50, 100 and 150 km/h respectively. The resulting range (beat) frequencies are 12.5, 25.0, 50.0 and 75.0 kHz for distances of 25, 50, 100 and 150 meters, respectively.

In the automotive application of FMCW radar, the spread of the range frequency $f_r$ and the spread of the Doppler frequency $f_d$ overlap and they both cannot be determined uniquely. The range frequency $f_r$ varies in a spread of approximately 10 to 80 kHz and the Doppler frequency $f_d$ varies in a spread of approximately −20 to 20 kHz. If there are two or more objects, the order of the beat frequencies is not determined only by the distance for each ramp. Namely, the pairing ($f_{b\text{-}up\text{-}1}$, $f_{b\text{-}down\text{-}1}$) and ($f_{b\text{-}up\text{-}2}$, $f_{b\text{-}down\text{-}2}$) will be unknown, where "−1" and "−2" express the object number. This leads to the pairing ambiguities and the wide range of the Doppler frequency also leads to the ambiguity in the relation between the distance and the velocity.

Figure 3:
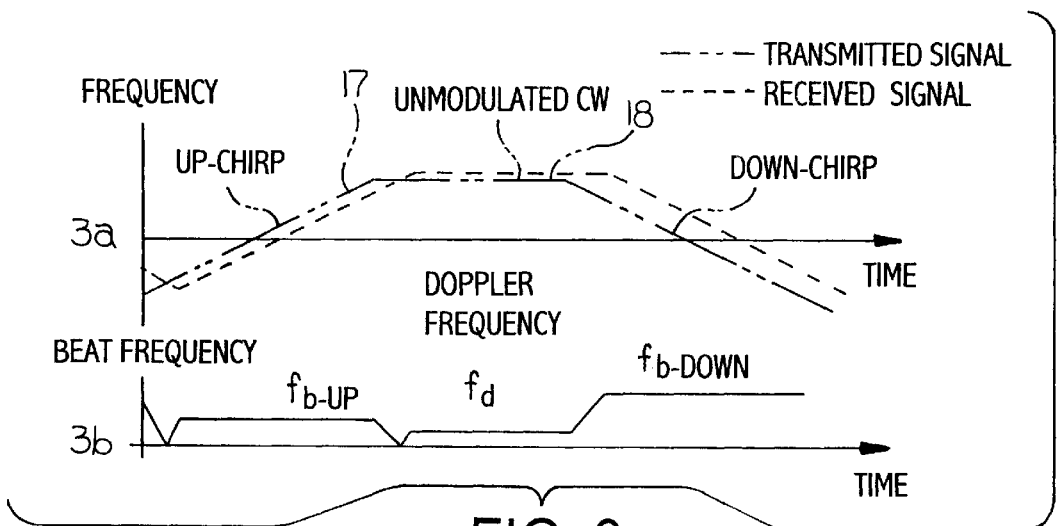
FIGS. 3a and 3b are plots of frequency versus time for the signals generated by another type of prior art FMCW radar including unmodulated CW.

In order to separate the frequencies, one known technique is to provide a transmitted signal 17 with an unmodulated portion 18 between the up-chirp portion and the down-chirp portion as shown in FIG. 3a with the beat frequency shown in FIG. 3b. The Doppler frequency $f_d$ is measured in the period of the unmodulated wave thereby resolving the ambiguity caused by the range frequency $f_r$ and the Doppler frequency $f_d$ overlap. But this known procedure becomes very complex for multiple targets.

Figure 4:
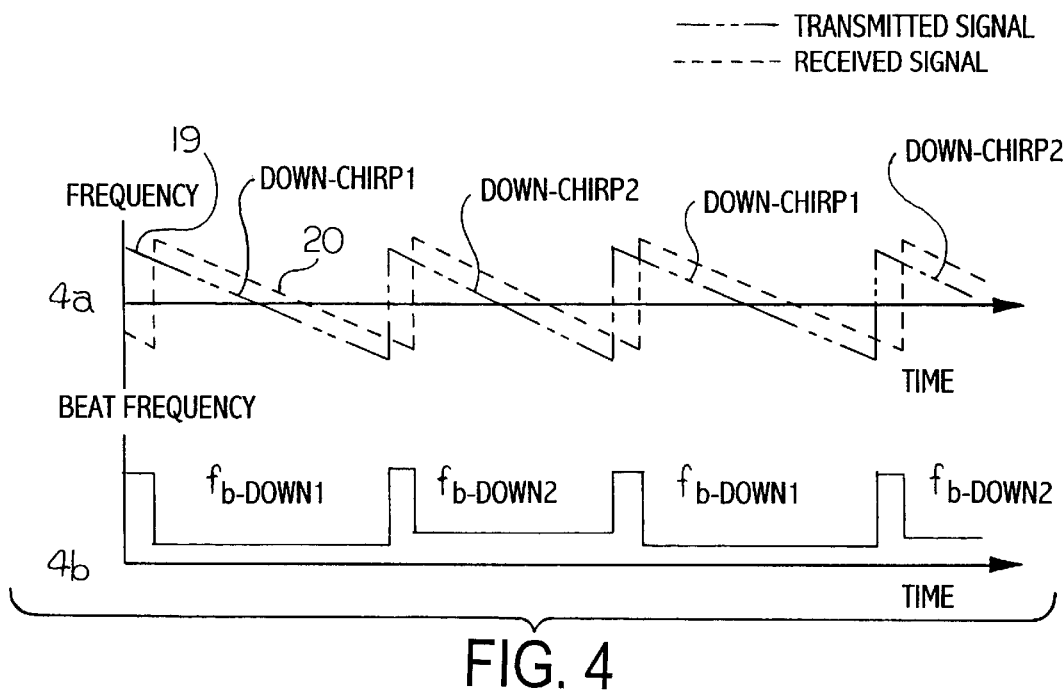
FIGS. 4a and 4B are plots of frequency versus time for a dual chirp with small difference of slope radar signal according to the present invention.

The method and apparatus according to the present invention overcome the "pairing" and the "distance and velocity" ambiguities when detecting multiple objects by utilizing plural chirps. As shown in FIG. 4a, a dual chirp signal 19 and a reflected signal 20 alternate a first chirp portion (down-chirp 1) having a first slope with a second chirp portion (down-chirp 2) having a second slope. The slope difference between the chirps is small so that the order of the beat frequencies, $f_{b\text{-}down1}(n)$ and $f_{b\text{-}down2}(n)$, n=1, . . . , N, where N is the number of targets, is not changed. The beat frequencies for the chirps are shown in FIG. 4b and are expressed by the equations:

$f_{b\text{-}down1}=|f_{r1}+f_d|$ for down-chirp1

$f_{b\text{-}down2}=|f_{r2}+f_d|$ for down-chirp2

$f_{r1}=|(2R/c)(df/dt)|$ $f_{r2}=|(2R/c)(df/dt)(1+\delta)|$

Since the δ is small, the polarity of $f_{r1}+f_d$ and $f_{r2}+f_d$ can be assumed not to be changed. By using the first two above equations, the difference between $f_{b\text{-}down1}$ and $f_{b\text{-}down2}$ is given by the following equation wherein the distance R is calculated without the ambiguity:

$df_b=|f_{b\text{-}down1}-f_{b\text{-}down2}|=|(2R/c)(df/dt)|\delta$

The frequency $f_d$ is calculated as shown by the following equations and the frequencies $f_{r1}$ and $f_{r2}$ are calculated by using the equations set forth above:

$f_d=f_{b\text{-}down1}-f_{r1}$ for $f_{b\text{-}down1}<f_{b\text{-}down2}$ $f_d=-f_{b\text{-}down1}-f_{r1}$ for $f_{b\text{-}down1}>f_{b\text{-}down2}$ Here δ is positive.

In the automobile application, the distance between the radar source (first vehicle) and the object (second vehicle, etc.) is positive and the relative velocity typically ranges from −50 km/h (object departing) to +150 km/h (approaching stationary objects). The polarity of the frequencies $f_{r1}$ and $f_{r2}$ is always positive (10 to 80 kHz) because of the down chirp and the Doppler frequency $f_d$ ranges from −20 to 20 kHz. If the down-chirp is chosen, the polarity of $f_{r1}+f_d$ and $f_{r2}+f_d$ is positive with a high degree of probability. And the most dangerous condition leading to a collision, in which the velocity is a positive high value, definitely has a positive value of $f_{r1}+f_d$ and $f_{r2}+f_d$. Therefore, the down-chirp is a better choice than the up-chirp.

Figure 5:
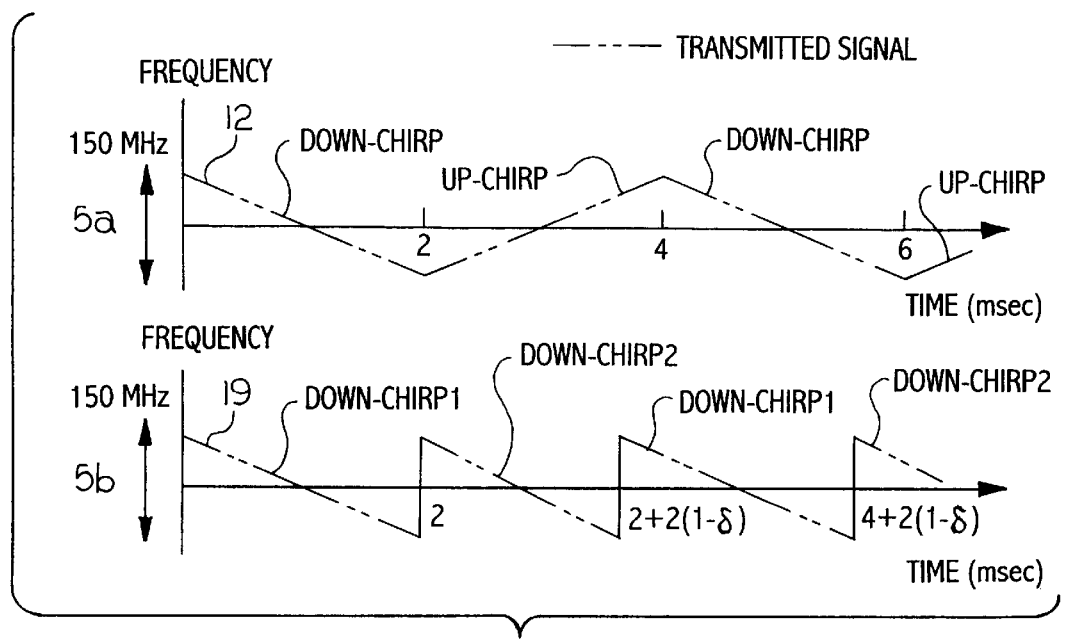
Figure 6:
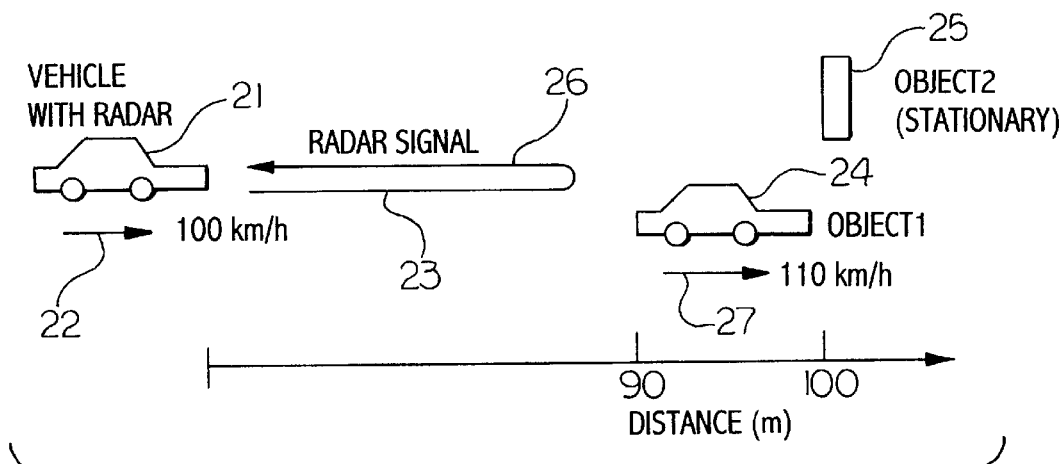
FIG. 6 is a schematic representation of a first example wherein two objects are detected.

In FIG. 5a, the conventional radar signal 12 shown in FIG. 2a is compared in FIG. 5b with the radar signal 19 according to the present invention shown in FIG. 4a. In FIG. 5b the excursion of the frequency is kept constants but it is also possible to keep the duration time constant for two chirps. FIG. 6 is a schematic representation of a situation involving the detection of two objects. A first vehicle 21 is travelling in a direction as shown by an arrow 22 at a velocity of 100 km/h. The vehicle 21 has a FMCW radar unit that transmits a radar signal 23 toward a first object 24 and a second object 25. A reflected radar signal 26 is returned to the radar unit. In this example, the first object 24 is a second vehicle travelling the same direction as the first vehicle 21 as shown by an arrow 27. The second vehicle 24 is travelling at 110 km/h and the second object 25 is stationary.

Figure 7:
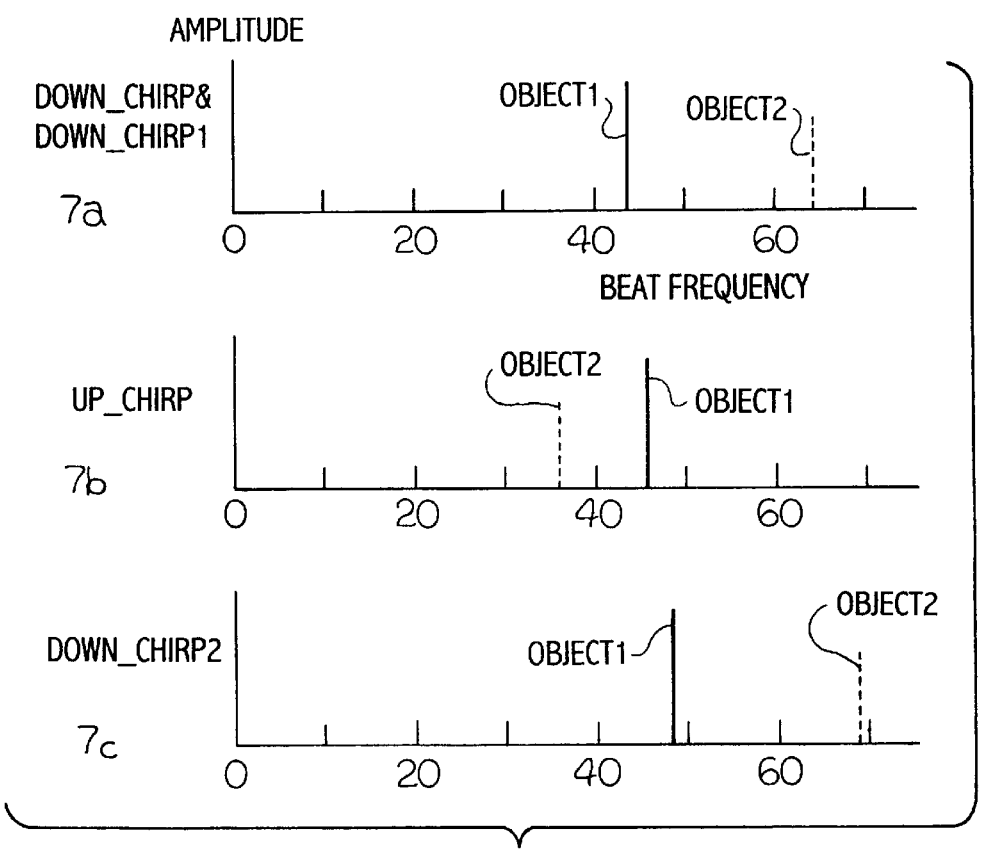
FIGS. 7a, 7b and 7c are plots of the beat frequencies, the frequencies of the beat signals, generated for the example shown in FIG. 6 by a conventional FMCW radar unit and the FMCW radar unit according to the present invention.

The beat frequency is shown in FIGS. 7a, 7b and 7c. If the radar signal 23 of FIG. 6 is generated by a conventional FMCW unit, the orders of the beat frequencies for the two objects are different in the down-chirps (FIG. 7a) and the up-chirps (FIG. 7b). This requires another analysis for identifying the beat frequency corresponding to each object which is a troublesome task.

If the radar signal 23 is generated by the FMCW unit according to the present invention, the orders of the beat frequencies are the same for the down-chirp1 (FIG. 7a) and the down-chirp2 (FIG. 7c). The pairing is made correctly and quickly. Therefore, the calculations for $df_b$ and $f_d$ can be made for each object.

Figure 8:
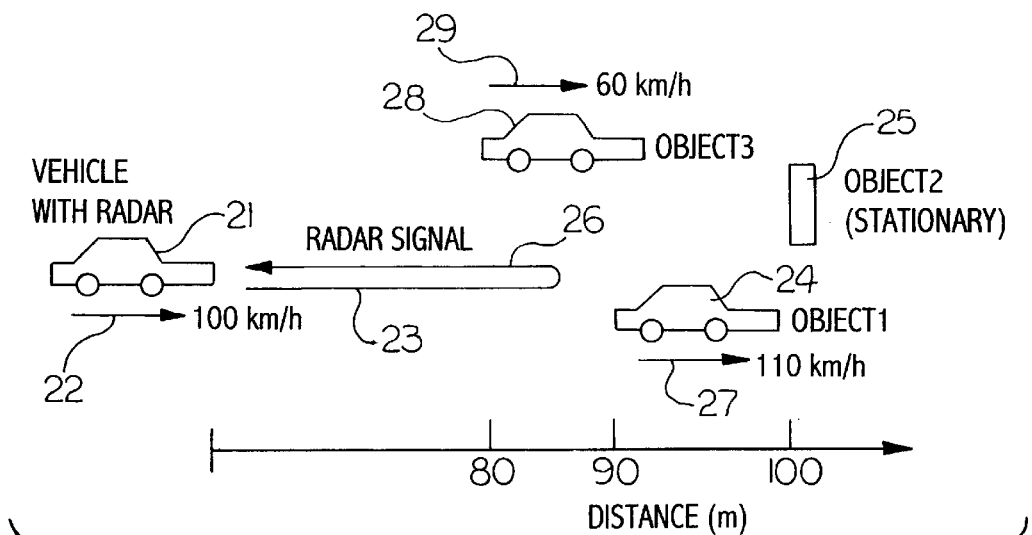
FIG. 8 is a schematic representation of a second example wherein thee objects are detected.
Figure 9:
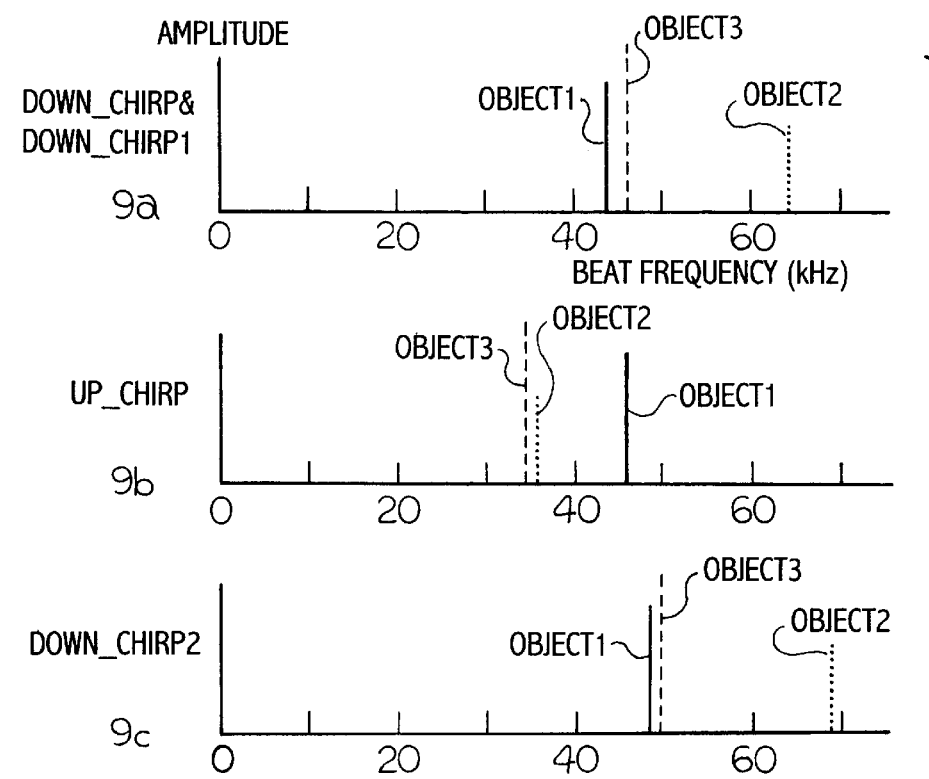
FIGS. 9a, 9b and 9c are plots of the beat frequencies, the frequencies of the beat signals, generated for the example shown in FIG. 8 by a conventional FMCW radar unit and the FMCW radar unit according to the present invention.

Another example is shown in FIG. 8 wherein a third object 28 is detected. The third object 28 is a third vehicle travelling at 60 km/h in the same direction as the first vehicle 21 as shown by an arrow 29. The beat frequencies are shown in FIGS. 9a, 9b and 9c. If the conventional FMCW is used, the beat frequencies corresponding to each object cannot be identified and additional measurements are required (FIGS. 9a and 9b). If the FMCW unit according to the present invention is used, the orders of beat frequencies are the same (FIGS. 9a and 9c) and so they are identified.

Figure 10:
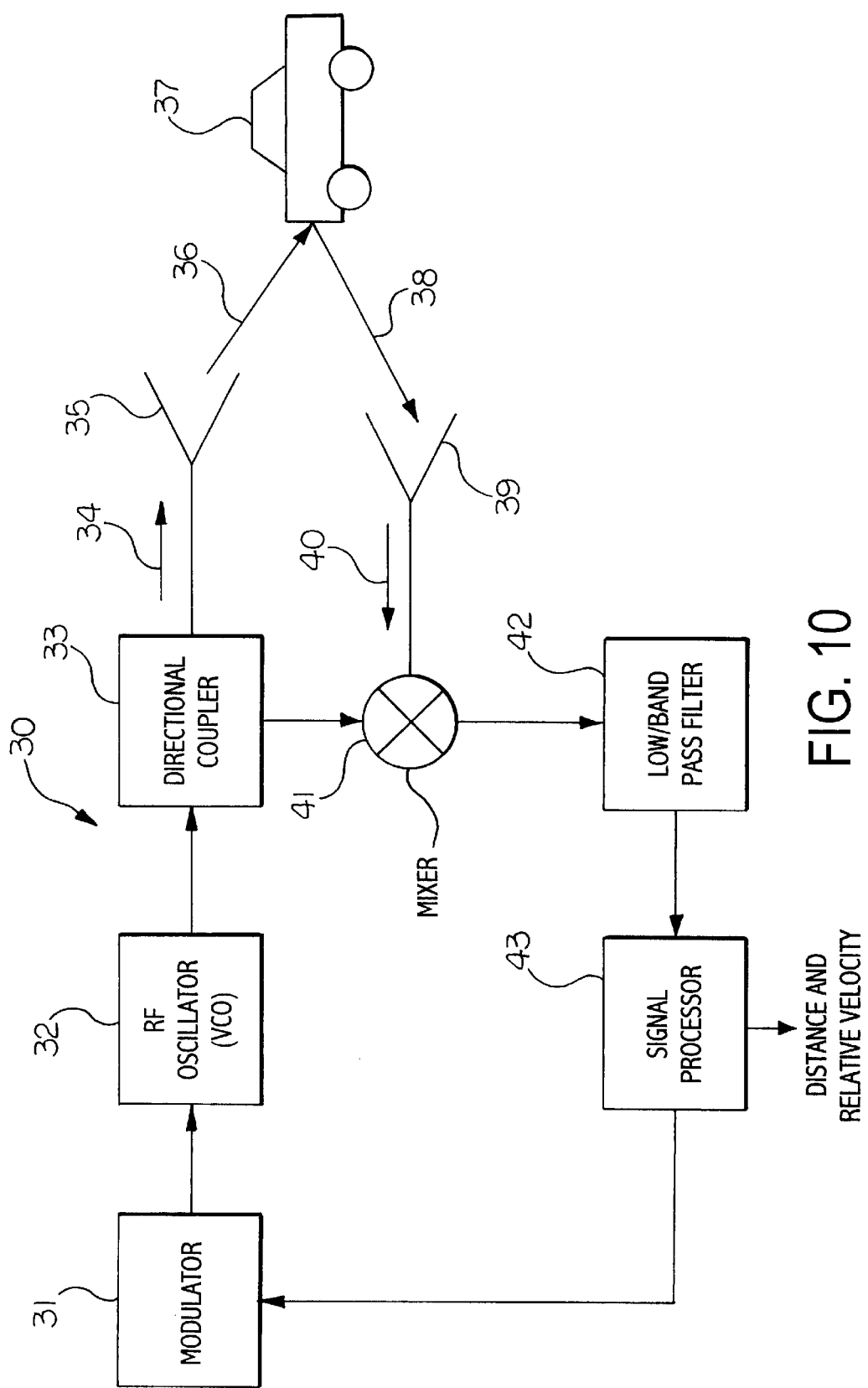
FIG. 10 is a schematic block diagram of a FMCW radar unit according to the present invention.

The FMCW radar method and apparatus according to the present invention is so simple and quick that it is practical for automobile applications. An apparatus 30 according to the present invention is shown in FIG. 10 wherein a chirp modulator 31 generates a two chirp frequency sweep with small slope difference (5% to 30% difference) for a RF oscillator 32. The oscillator 32 generates a radar signal, and the radar signal is divided by a directional coupler 33. A first portion 34 of the radar signal is transmitted through a transmitting antenna 35. A transmitted radar signal 36 leaves the antenna 35 and strikes an object 37 to generate a reflected radar signal 38. The reflected signal 38 is received by a receiving antenna 39 to generate a received signal 40 to a mixer 41. A second portion of the radar signal is sent from the coupler 33 to the mixer 41 and mixed with the received signal 40 to then pass through a Low/band pass filter 42 to generate beat signals to a signal processor 43. The processor 43 calculates the distance and relative velocity for each object. The difference of the beat frequencies of corresponding objects is used for calculation of the distance for each object. By using the magnitude of the two frequencies, the velocity of each object can be calculated. After seeing the beat frequencies generated by the first chirp, the slope difference can be changed adaptively by the processor 43 to optimize operation. When there is a lower limitation of the slope owing to a hardware limitation, the amplitude information of the beat frequencies is effective to determine the correct pair.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:
1. A method for detecting multiple objects using frequency modulated continuous wave radar comprising the steps of:
 a. generating a continuous wave radar signal;
 b. modulating the continuous wave radar signal with a pair of chirp frequency sweeps having slightly different slopes to generate a frequency modulated continuous wave (FMCW) radar signal;
 c. transmitting the FMCW radar signal to strike at least a pair of objects;
 d. receiving a reflected radar signal from each of the objects;
 e. determining from the transmitted radar signal and the reflected radar signals a beat frequency associated with each of the objects and each of the sweeps; and
 f. indicating a distance to each of the objects based upon the beat frequencies.

2. The method according to claim 1 including modulating the continuous wave radar signal by alternating the sweeps.

3. The method according to claim 1 wherein each of the sweeps has a downward slope.

4. The method according to claim 1 wherein said step e. is performed by eliminating a Doppler frequency.

5. The method according to claim 1 wherein said step e. is performed by comparing the amplitudes of the beat frequencies.

6. The method according to claim 1 including adaptively changing the difference in the slopes based upon the beat frequencies associated with a first one of the sweeps to optimize said step f.

7. The method according to claim 1 including calculating the distance and a relative velocity for each of the objects from the beat frequency for each sweep.

8. The method according to claim 1 wherein the slightly different slopes have values in a range of 5% to 30% different from one another.

9. A method for detecting multiple objects using frequency modulated continuous wave radar comprising the steps of:
 a. generating a continuous wave radar signal;
 b. modulating the continuous wave radar signal with a pair of chirp frequency sweeps having slightly different slopes to generate a frequency modulated continuous wave (TMCW) radar signal, the sweeps being alternately applied to the continuous wave radar signal;
 c. transmitting the FMCW radar signal to strike at least two objects;
 d. receiving a reflected radar signal from each of the objects;
 e. determining from the transmitted radar signal and the reflected radar signals a beat frequency associated with each of the objects and each of the sweeps; and
 f. indicating a distance to each of the objects based upon the beat frequencies.

10. The method according to claim 9 wherein said step e. is performed by eliminating a Doppler frequency.

11. The method according to claim 9 wherein said step e. is performed by comparing the amplitudes of the beat frequencies.

12. The method according to claim 9 including adaptively changing the difference in the slopes based upon the beat frequencies associated with a first one of the sweeps to optimize said step f.

13. The method according to claim 9 wherein each of the sweeps his a downward slope.

14. The method according to claim 9 including calculating the distance and a relative velocity for each of the objects from the beat frequency for each sweep.

15. An apparatus for detecting multiple objects using frequency modulated continuous wave radar comprising:
- a chirp generator for generating two chirp frequency sweeps frequency modulating a continuous wave radar signal, the two sweeps having slightly different slopes;
- a transmitting antenna connected to said chirp generator for transmitting the frequency modulated continuous wave radar signal;
- a receiving antenna for receiving a reflected radar signal representing a portion of the transmitted radar signal reflected from each of two objects;
- a mixer connected to receive and being responsive to the transmitted radar signal and the reflected radar signal for generating a separate beat signal for each of the two sweeps; and
- a signal processor connected to said mixer and being responsive to the beat signals for indicating a distance to each of the objects.

16. The apparatus according to claim 15 wherein said chirp generator alternates the generation of the two sweeps.

17. The apparatus according to claim 16 wherein said chirp generator begins generating each of the sweeps at an end of a preceding one of another of the sweeps.

18. The apparatus according to claim 15 including a Low/band pass filter connected between said mixer and said signal processor for filtering unnecessary frequency components from the beat signals.

19. The apparatus according to claim 15 wherein said signal processor calculates the distance for each of the objects.

20. The apparatus according to claim 15 wherein said signal processor calculates a relative velocity for each of the objects.

* * * * *